Figure 1:
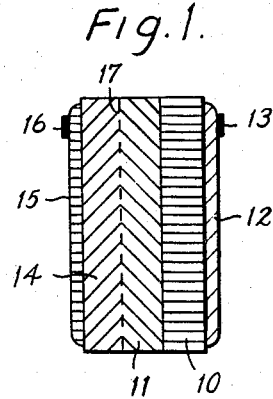

Jan. 20, 1959  C. H. WALKER ET AL  2,870,342
DEVICES FOR AMPLIFYING OR CONVERTING RADIATION
Filed May 21, 1956

INVENTORS
CYRIL HUBERT WALKER
MAURICE GEORGE CLARKE
BY
ATTORNEY

2,870,342

DEVICES FOR AMPLIFYING OR CONVERTING RADIATION

Cyril Hubert Walker, Rugby, and Maurice George Clarke, Church Lawford, near Rugby, England, assignors to The British Thomson-Houston Company Limited, London, England, a British company Application May 21, 1956, Serial No. 586,122

Claims priority, application Great Britain May 26, 1955

1 Claim. (Cl. 250—213)

This invention relates to devices for receiving incident radiation and producing radiation of a similar character but of greater intensity than the incident radiation or for converting the incident radiation to radiation of a different wave length.

Materials are known which exhibit a change in electric conductivity through the material when subjected to incident radiation. Other materials generally known as electro-luminescent materials are caused to luminesce when they are subjected to electric stress provided by a difference of potential between the electrodes between which material is located.

The object of the present invention is to provide a device which simultaneously utilises these properties of the materials in question.

A radiation amplifying or converting device, in accordance with the invention, comprises two conducting electrodes, both of which are transmissible of radiation of predetermined wave lengths, between which electrodes are super-imposed layers (a) of a material capable of producing, in response to incident radiation, a change in electric conductivity through the material when an alternating potential is applied between the electrodes between which the material is located, and (b) of a material capable of emitting visible radiation in response to an electric stress resulting from an alternating potential incident between electrodes between which the material is located, said layers being separated from one another by a material of high permittivity and dielectric strength and good light reflectivity.

Such a device may then be used to amplify the radiation incident upon layer (a) by producing an increased intensity of the radiation emitted from layer (b), or where layer (a) is excited by radiation of one wave length or range of wave lengths whilst layer (b) produces, when excited, radiation of a wave length, or range of wave lengths, differing from that incident upon layer (a), to convert the incident radiation on layer (a) into a radiation of different wave length; for example, if the incident radiation on layer (a) is of weak X-rays, visible light may be emitted from layer (b) of greater intensity than that which would be produced were the incident X-rays to fall upon a normal fluorescent screen. Layers (a) and (b) may each be constituted of finely divided materials dispersed in insulation so that variation in the intensity of radiation incident upon elementary areas of layer (a) produce corresponding variations in the radiation emitted from similarly located elementary area of layer (b). Layer (a) may consist of a photo-conducting material which may be embedded in a glass of low melting point, whilst layer (b) may be constituted of electro-luminescent phosphor, also embedded in a glass of low melting point. Layers (a) and (b) may alternatively be constituted of transparent homogeneous, non-granular films produced by a vapour phase reaction in an oxygen free atmosphere or by direct vacuum evaporation.

In the preferred form of this invention the two layers are deposited upon the two sides of a wafer of insulting material which may be constituted of barium titanate or titanium dioxide. The barium titanate or the titanium dioxide may be in sintered form such as that known and used in connection with the manufacture of ceramic capacitor discs.

The conducting electrodes provided on the external faces of the two layers may be in the form of a metal layer formed by vacuum deposition on to the respective faces of the photo-conducting and electro-luminescent layers. Alternatively, the electrode may be constituted of a conducting layer formed in known manner on glass, e. g. by spraying with tin chloride solution while the glass is heated.

The invention will be better understood from a consideration of the following description of the accompanying drawings, Figs. 1 to 4 of which show, in cross-section, four different embodiments of the same.

Referring firstly to Fig. 1, there is shown a radiation amplifying or converting device, consisting of a first layer 10 formed of a photo-conducting material capable of producing in response to incident radiation, a change in electric conductivity through the material when an alternating potential is applied between electrodes between which it is located. The layer 10 is located upon a wafer 11 of an insulating material of high specific inductive capacity, such as titanium dioxide or barium titanate of a polycrystalline nature. On the face of the layer 10 remote from the insulating wafer is located a conducting electrode 12 which is transmissible of the radiation to which the material in layer 10 responds. Contact is made to the transparent conducting electrode by means of a terminal lead 13. On the other face of the wafer 11 is located a second layer 14 consisting of a material capable of emitting visible radiation in response to an electric stress resulting from an alternating potential incident between electrodes between which the material is located. Upon the layer 14 is deposited a second conducting electrode 15 which is transparent to the visible radiation emitted by the layer 14. A terminal connection 16 is made to the electrode 15.

Thus by applying an alternating potential between terminals 13 and 16 of the electrodes 12, 15, electric stress may be set up across layers 10, 14, which are separated by the insulating wafer 11. When incident radiation falls upon the first layer 10 through the transmissible electrode 12, localised regions or elementary areas of differing conductivity are produced in the layer 10 corresponding with the differing intensities of the incident rays. The resultant change in electric stress excites the correspondingly located regions of the second layer 14, causing them to be excited to emit radiation. If the incident radiation upon layer 10 is of a different form from the radiation emitted by layer 15, the device serves as a radiation converter; if, however, photo-conducting material in layer 10 is responsive to visible light, then the visible radiation emitted from the layer 14 represents an amplified image of the incident radiation upon the layer 10.

If the amount of light transmitted from the wafer 11 is sufficient to cause feed-back, it may be necessary to interpose an opaque screen between the layers 10, 14, such as is indicated by the interrupted line 17. The material of which the screen is composed may be of high resistivity. If a low resistivity material such as manganese dioxide, carbon or graphite is used the layer should be so applied as to form discrete areas, e. g. by application of the material through a screen. The same effect can be obtained if the individual particles are insulated from one another by being suspended in an insulating binder, e. g. a methacrylate resin.

The photo-conducting material may consist of selenium, antimony trisulphide or cadmium sulphide, the material in powder form being dispersed within a solid insulating medium. The material in the second layer 14 may consist of electro-luminescent zinc-sulphide activated with copper or manganese.

The photo-conducting and phosphor materials should each be constituted of finely divided materials and dispersed in insulation so that variation in the intensity of radiation incident upon localised regions or elementary areas of the layer 10 may produce corresponding variations in the radiation emitted from the similarly located localised regions or elementary areas of layer 14. The materials in powdered form may be dispersed in a glass of low melting point, e. g. a boro-phosphate glass, or in an organic dielectric such as polystyrene, polybutyl methacrylate and the like. Alternatively, the layers 10 and 14 may be constituted of non-granular films of the material produced by a vapour phase reaction in an oxygen-free atmosphere, or by direct vacuum evaporation.

Figure 2:
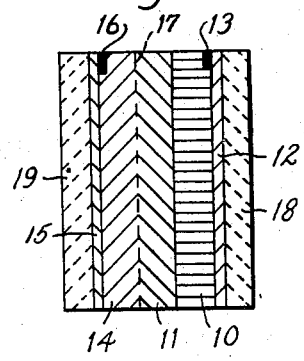

In the alternative embodiment illustrated in Fig. 2, the conducting electrodes 12, 15 are each in the form of a conducting layer on glass, the glass plates on which the films are formed being indicated at 18, 19, respectively. The glass plates 18, 19 then serve to support and protect the layers of phosphor and ceramic material located between them.

Figure 3:
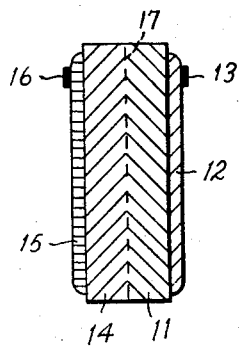

Fig. 3 represents an alternative construction in which the wafer 11 of ceramic material such as titanium dioxide is itself rendered photo-conducting by reduction in hydrogen or in vacuo to the form known as the "blue" form, the titanium dioxide thus constituting a material which is sensitive to incident radiation and thus constitutes the first layer of material. Conducting electrode 12 is produced on one face of the treated titanium dioxide wafer by heating it at a temperature of 600° C. with one surface in contact with zinc dust. There is then applied to the other surface of the wafer a layer 14 of phosphor capable of emitting visible radiation when subjected to a change in electric stress, the phosphor being embedded in insulating material, as above described. If the phosphor is dispersed in glass, the glass itself may be treated to provide the conducting electrode 15 on its surface.

Figure 4:
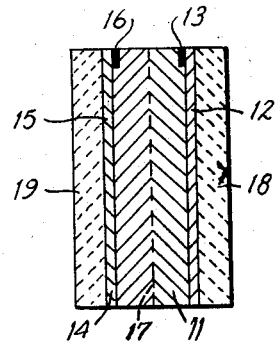

The modified arrangement illustrated in Fig. 4 utilises the arrangement described in connection with Fig. 3, but with the glass protecting plates 18, 19 on which the conducting electrodes 12, 15, respectively are formed. The arrangement of Fig. 4 thus bears some relation to that described in connection with Fig. 3, as does the arrangement of Fig. 2 with respect to that of Fig. 1.

If it be desired to exclude moisture and prevent other atmospheric conditions from affecting the device, the assembly may be sealed in a coating of transparent varnish or resin through which the conductors 13, 16 are led.

What we claim is:

A radiation-converting device comprising a sheet of insulating material of high specific inductive capacity selected from the group consisting of poly-crystalline barium titanate and titanium dioxide, a first layer located on one face of said sheet consisting of a powdered material capable of producing in response to radiation of a range of wave lengths incident upon it a change in electric conductivity when said material is subjected to a varying electric stress, said powdered material being dispersed in a low melting point glass, a first conducting electrode located on the face of said first layer remote from said sheet, said electrode being transmissible of a radiation to be incident upon said first layer, a second layer on the other face of said sheet consisting of a powdered material capable of emitting visible radiation in response to a change in electric stress to which it is subjected, said last-mentioned powdered material being dispersed in a low melting point glass, and a second electrode capable of transmitting visible radiations located adjacent to said second layer.

References Cited in the file of this patent

UNITED STATES PATENTS 2,650,310    White                  Aug. 25, 1953

FOREIGN PATENTS 157,101    Australia              June 16, 1954

OTHER REFERENCES

"A Solid-state Image Intensifier," Orthuber and Ullery, Journal of the Optical Society of America, volume 44, No. 4, 297–299, April 1954 (3 pp. spec.)

"Photoconductive Films," Quarterly Report No. 6, second series of the Computer Components Fellowship No. 347 of The Mellon Institute of Industrial Research, Jan. 1, 1955 to March 31, 1955, 1 sheet dwg. (5 pp. spec.).